US012327873B2

(12) United States Patent
Eom et al.

(10) Patent No.: US 12,327,873 B2
(45) Date of Patent: *Jun. 10, 2025

(54) LITHIUM SECONDARY BATTERY

(71) Applicant: SAMSUNG SDI CO., LTD., Yongin-si (KR)

(72) Inventors: Hyeri Eom, Suwon-si (KR); Seungjae Lee, Suwon-si (KR); Sol Choi, Suwon-si (KR); Da-Un Han, Suwon-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/203,161

(22) Filed: May 30, 2023

(65) Prior Publication Data

US 2023/0307660 A1 Sep. 28, 2023

Related U.S. Application Data

(63) Continuation of application No. 16/609,354, filed as application No. PCT/KR2018/003510 on Mar. 26, 2018, now Pat. No. 11,688,858.

(30) Foreign Application Priority Data

May 19, 2017 (KR) .................... 10-2017-0062458

(51) Int. Cl.
*H01M 4/74* (2006.01)
*H01M 4/66* (2006.01)
(Continued)

(52) U.S. Cl.
CPC .......... *H01M 4/747* (2013.01); *H01M 4/661* (2013.01); *H01M 4/667* (2013.01); *H01M 4/668* (2013.01);
(Continued)

(58) Field of Classification Search
None
See application file for complete search history.

(56) References Cited

U.S. PATENT DOCUMENTS 11,688,858 B2 * 6/2023 Eom .................. H01M 4/747
429/245
2001/0031402 A1 10/2001 Imai et al.
(Continued)

FOREIGN PATENT DOCUMENTS

CN 1313646 A 9/2001
CN 2510965 Y 9/2002
(Continued)

OTHER PUBLICATIONS

International Search Report dated Jun. 29, 2018, for PCT/KR2018/003510.
(Continued)

*Primary Examiner* — Jeremiah R Smith
(74) *Attorney, Agent, or Firm* — Lee IP Law, P.C.

(57) ABSTRACT

The present invention relates to a lithium secondary battery comprising: a current collector comprising a structure in a fabric form in which fiber bundles are cross-woven, wherein each of the fiber bundles is formed of sets of fiber yarns and each of the fiber yarns includes a polymer fiber and a metal layer surrounding the polymer fiber; and an electrode including an active material layer disposed on at least one surface of the current collector.

7 Claims, 4 Drawing Sheets

(51) Int. Cl.
  *H01M 10/052* (2010.01)
  *H01M 4/72* (2006.01)
  *H01M 4/75* (2006.01)

(52) U.S. Cl.
  CPC .......... *H01M 10/052* (2013.01); *H01M 4/665* (2013.01); *H01M 4/72* (2013.01); *H01M 4/75* (2013.01)

(56) References Cited

U.S. PATENT DOCUMENTS

| | | |
|---|---|---|
| 2004/0013812 A1 | 1/2004 | Kollmann et al. |
| 2006/0159998 A1 | 7/2006 | Harada et al. |
| 2009/0311587 A1* | 12/2009 | Best .................. H01M 4/74 429/127 |
| 2010/0136434 A1 | 6/2010 | Hanafusa |
| 2012/0129047 A1 | 5/2012 | Matsuyama et al. |
| 2012/0148902 A1 | 6/2012 | Kwon et al. |
| 2012/0202101 A1 | 8/2012 | Ueda |
| 2013/0130119 A1* | 5/2013 | Majima ............... H01M 4/0404 427/122 |
| 2013/0280580 A1 | 10/2013 | Gaikwad et al. |
| 2015/0064570 A1 | 3/2015 | Wendler et al. |
| 2015/0207149 A1 | 7/2015 | Froeis et al. |
| 2020/0235385 A1 | 7/2020 | Kim |

FOREIGN PATENT DOCUMENTS

| | | |
|---|---|---|
| CN | 104425828 A | 3/2015 |
| JP | 2006-310261 | 11/2006 |
| KR | 10-2011-0127972 | 11/2011 |
| KR | 10-2014-0136672 | 12/2014 |
| KR | 10-1526800 | 6/2015 |
| KR | 10-2015-0140619 | 12/2015 |
| KR | 10-2015-0143364 | 12/2015 |
| KR | 10-2016-0005933 | 1/2016 |
| KR | 10-1675336 | 11/2016 |

OTHER PUBLICATIONS

Chinese Office action dated Dec. 31, 2021 and Chinese Search Report dated Dec. 27, 2021.
Chinese Office Action dated Jul. 29, 2022, for corresponding Chinese Patent Application No. 201880031667.4.

* cited by examiner

[Table 1]

| | Example 1 | Example 2 | Comparative Example 1 | Comparative Example 2 |
|---|---|---|---|---|
| Structure type | Woven type | High density woven type | - | Non-woven fabric |
| Diameter of fiber bundles (μm) | 20 | 18-20 | - | 10 |
| Horizontal resistance (mΩ) | 40 | 40 | - | 40 |
| Elongation rate (%) | 24.2 | 26.0 | 2.3 | 10.2 |
| Microscopic image |  |  | - |  |

LITHIUM SECONDARY BATTERY

CROSS REFERENCE TO RELATED APPLICATIONS

This is a continuation application based on pending application Ser. No. 16/609,354, filed Oct. 29, 2019, the entire contents of which is hereby incorporated by reference.

Parent application Ser. No. 16/609,354 is the U.S. national phase application based on PCT Application No. PCT/KR2018/003510, filed Mar. 26, 2018, which is based on Korean Patent Application No. 10-2017-0062458, filed May 19, 2017, the entire contents of both being hereby incorporated by reference.

The present invention relates to a lithium secondary battery.

Recently, numerous flexible electronics such as flexible displays, flexible RFIDs, flexible organic solar cells, flexible transistors, flexible sensors, and the like, have been exploded and are already commercially available. In addition, in order to operate such electronic equipment while utilizing flexible characteristics, a battery having good flexibility is inevitably required. However, at present, some flexible batteries have been developed in research levels, but cycle-life characteristics or capacities of the batteries are insufficient for actual industries. As a result of research of flexible batteries, researches on flexible batteries such as flexible batteries using fabric, flexible batteries using metal meshes or carbon nanotubes (CNT) as a current collector, and the like are being conducted in various ways but they have not been developed much in terms of battery performance.

Therefore, efforts have been made to develop flexible batteries for flexible secondary batteries having excellent performance.

DISCLOSURE

Technical Problem

An embodiment provides lithium secondary battery including a current collector that improves output characteristics of the battery by improving the flexibility and metal strength, simultaneously reducing outermost irreversible capacity of a stack-type lithium secondary battery, and extending an interface area of electrodes and current collectors to facilitate electron transfer.

Technical Solution

An embodiment of the present invention provides a lithium secondary battery including an electrode including a current collector including a structure in a fabric form in which fiber bundles are cross-woven, wherein each of the fiber bundles is formed of sets of fiber yarns, the fiber yarn includes a polymer fiber and a metal layer surrounding the polymer fiber, and an active material layer disposed on at least one surface of the current collector.

An elongation rate of the structure may be 5% to 45%.

A volume ratio of the polymer fiber relative to the entire volume of the structure may be 50% to 90%.

The volume ratio may be 60% to 80%.

A diameter of the fiber bundles may be 15 μm to 30 μm.

The polymer fiber may be selected from polyethylene terephthalate, polypropylene, polyethylene, and a combination thereof.

A thickness of the metal layer may be 150 nm to 1500 nm.

The metal layer may include nickel, cobalt, iron, or silver; and copper, or aluminum.

The metal layer may include a first metal layer surrounding the polymer fiber and a second metal layer surrounding the first metal layer, the first metal layer may include nickel, cobalt, iron, or silver, and the second metal layer may include copper, or aluminum.

A third metal layer surrounding the second metal layer may be further included, each of the first metal layer and the third metal layer may include nickel, cobalt, iron, or silver, and the second metal layer may include copper, or aluminum.

A thickness of the second metal layer may be larger than a thickness of each layer of the first metal layer and the third metal layer.

A thickness of the second metal layer may be 100 nm to 1000 nm.

A thickness ratio of the second metal layer relative to a thickness of each layer of the first metal layer and the third metal layer may be greater than 1 and less than or equal to 6.

Advantageous Effects

By using the current collector with improved flexibility and metal strength simultaneously, outermost irreversible capacity in the stack-type lithium secondary battery may be reduced, and the interface area between the current collector and the active material layer applied to the current collector may be expanded to facilitate electron transfer and thus to provide a lithium secondary battery with improved output characteristics of the battery.

DESCRIPTION OF SYMBOLS

| | |
|---|---|
| 100: lithium secondary battery | |
| 10: electrode assembly | 20: battery case |
| 13: electrode tab | |
| 1: polymer fiber | 2: nickel-containing metal layer |
| 3: copper/aluminum-containing metal layer | |
| 201: fiber bundles | 101: structure |
| 301: fiber yarn | |

BEST MODE

Hereinafter, embodiments of the present invention are described in detail. However, these embodiments are exemplary, the present invention is not limited thereto and the present invention is defined by the scope of claims.

As used herein, when specific definition is not otherwise provided, It will be understood that when an element such as a layer, film, region, or substrate is referred to as being "on"

another element, it can be directly on the other element or intervening elements may also be present.

A lithium secondary battery according to an embodiment includes an electrode including a current collector and an active material layer disposed on at least one surface of the current collector.

The current collector is described with reference to FIG. 1.

Figure 1:
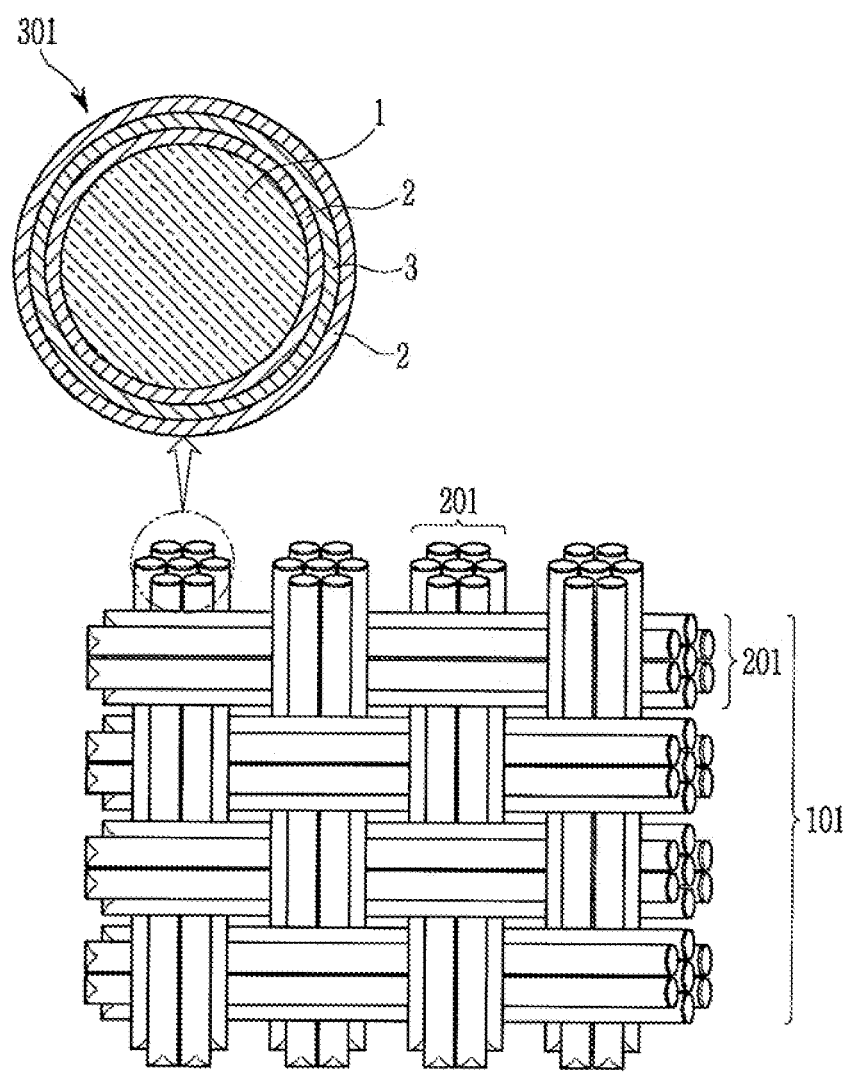
FIG. 1 is a schematic view showing a structure in a current collector according to an embodiment.

Referring to FIG. 1, a current collector includes a structure 101 in a fabric form in which fiber bundles 201 may be cross-woven, the fiber bundles may be formed of sets of fiber yarns 301, and the fiber yarn may include a polymer fiber 1 and metal layers 2 and 3 surrounding the polymer fiber.

A general metal substrate such as a copper foil or an aluminum foil has no flexibility and thus causes a short circuit of a tab or an electrode plate by repetitive stresses such as bending/twisting and the like and accordingly, is limitedly applied to a flexible battery device.

Accordingly, in order to overcome the limit of the conventional copper foil or aluminum foil and apply it to the flexible battery device, a current collector simultaneously having flexibility and metal strength is introduced.

Since the current collector according to an example embodiment include a structure in a fabric form in which fiber bundles formed of sets of fiber yarns are cross-woven, the current collector substrate has a uniform structure and resultantly, contributes to manufacturing a uniform electrode. As for a non-woven fabric having a non-uniform structure wherein the fiber yarns are randomly positioned, an electrode becomes non-uniform due to non-uniformity of the substrate itself, and accordingly, there may be a problem of lithium precipitation and the like.

The structure in a fabric form in which fiber bundles are cross-woven may exhibit an elongation rate in a range of 5% to 45%.

Herein, the elongation rate is obtained by calculating a deformation rate of an object until broken during a tension test thereof with a reference to a state before the test as a percentage, and herein, as the percentage is the higher, flexibility is increased.

In an example embodiment of the present invention, the elongation rate may be in a range of 5% to 35%, specifically, 10% to 35%, and more specifically, 20% to 30%.

When the elongation rate is less than 5%, and a physical impact from outside (bending, twisting, and the like) is applied, the elongation stops after a predetermined length, and a short circuit of a positive electrode and/or a negative electrode occurs, and resultantly, battery stability may not be secured.

When the elongation rate is greater than 45%, and a physical impact from outside (bending, twisting, and the like) is also applied, endurance about the stress is very weak, and tension of a material may easily occur, and accordingly, durability of a flexible battery is deteriorated.

A volume ratio of that of the polymer fiber relative to an entire volume of the structure may be in a range of 50% to 90%.

The volume ratio may be obtained as follows.

A substrate is dipped in aqua regia (nitric acid hydrochloride) to remove a metal plate layer and measure mass of a fabric panel alone, and then, an actual volume of the fabric panel is obtained through theory density (PET and the like) of the fabric panel.

A width, length, and thickness of the fabric panel are measured to obtain an entire volume of the fabric panel including pores, and then, the entire volume of the fabric panel including pores is compared with the actual volume of the fabric panel alone to obtain the volume ratio.

Specifically, the volume ratio may be 60% to 80% and specifically, 60% to 70%.

When a volume ratio of the polymer fiber taken in the entire structure is within the range, appropriate electrical conductivity and electrode strength may be obtained.

In other words, when the volume ratio is greater than 90%, a relative metal specific gravity is decreased, and thus the electrical conductivity is deteriorated, and resultantly, cell performance is deteriorated, but when less than or equal to 50%, a load that a substrate can endure is decreased, and the substrate may be inappropriate to use.

A diameter of the fiber bundles may be 15 µm to 30 µm.

Specifically, it may be 15 µm to 25 µm and more specifically, 18 µm to 20 µm.

The fiber bundles according to an example embodiment constitute one unit in the structure in a fabric form, wherein as the sets of fiber yarns are more included in the unit volume, the structure may be formed to have higher density.

Particularly, when the fiber bundles have a diameter within the range, the structure in a fabric form has a wide surface area during the metal plating and thus is expected to have an electron transfer improvement effect as a current collector.

On the other hand, when the structure is a non-woven fabric type, fiber yarns constitute one unit therein, wherein the diameter of the fiber bundles indicates that of the fiber yarns.

The polymer fiber may be selected from polyethylene terephthalate, polypropylene, polyethylene, and a combination thereof, and may be, for example, selected from polyethylene terephthalate, polypropylene, and a combination thereof.

A thickness of the metal layer may be 150 nm to 1500 nm.

Specifically, the thickness may be 250 nm to 1000 nm, and more specifically, 500 nm to 700 nm.

When the thickness of the metal layer is less than 150 nm, relative metal specific gravity may be lowered, electrical conductivity may be lowered and cell performance may be deteriorated, and when it exceeds 2000 nm, the relative metal specific gravity may become higher, so a porosity may be lowered, and thus a volume of the active material may become smaller, thereby decreasing electrical conductivity. In addition, flexibility of the structure may be reduced, and the metal layer may be detached.

In addition, the metal layer may include nickel, cobalt, iron, or silver; and copper, or aluminum.

When copper is included in the metal layer, it may be a negative electrode substrate, and when aluminum is included in the metal layer, it may be a positive electrode substrate.

The metal layer includes a first metal layer 2 surrounding the polymer fiber and a second metal layer 3 surrounding the first metal layer, the first metal layer may include nickel, cobalt, iron, or silver, and the second metal layer may include copper, or aluminum.

A third metal layer 2 surrounding the second metal layer may be further included, and each of the first metal layer and the third metal layer may include nickel, cobalt, iron, or silver, and the second metal layer may include copper or aluminum.

A thickness of the second metal layer may be larger than a thickness of each layer of the first metal layer and the third metal layer.

According to a specific example embodiment of the present invention, the second metal layer plays a role of a current collector and uses a metal having the highest conductivity, and plating of the first metal layer may correspond to a pretreatment for facilitating plating of the second metal layer, and the third metal layer may correspond to a post-treatment for preventing oxidization of the second metal layer.

For example, a thickness of the second metal layer may be 100 nm to 1000 nm.

Specifically, it may be 150 nm to 800 nm, more specifically 250 nm to 500 nm, and for example 300 nm to 500 nm.

When the second metal layer has a thickness within the range, conductivity of a current collector is increased and thus may bring about an equal cell performance to that of the general Cu substrate.

A thickness ratio of the second metal layer relative to each thickness of the first and third metal layers may be greater than 1 and less than or equal to 6.

Specifically, the thickness ratio will be greater than 1 and less than or equal to 5 and specifically, greater than 2 and less than or equal to 5.

When the second metal layer has the above thickness ratio, a conductor conductivity is improved and accordingly, may bring about a conductivity-improving effect.

The active material layer may include an active material, a binder, and optionally a conductive material.

For example, the active material may be a positive active material, the positive active material includes a positive active material capable of reversible intercalation and deintercalation of lithium ions, and representative examples of such positive active materials include $LiCoO_2$, $LiNiO_2$, $LiMnO_2$, $LiMn_2O_4$, or $LiNi_{1-x-y}Co_xM_yO_2$ ($0 \leq x \leq 1$, $0 \leq y \leq 1$, $0 \leq x+y \leq 1$, and M is a metal such as Al, Sr, Mg, La, and the like). However, in the present invention, it is of course possible to use other types of positive active materials in addition to the positive active materials.

The active material may be for example negative active material, the negative active material includes a negative active material capable of intercalation and deintercalation of lithium ions, and such negative active materials may be selected from the group consisting of carbon-based negative active materials of crystalline or amorphous carbon, a carbon fiber, or a carbon composite, tin oxide, lithiated products thereof, lithium, a lithium alloy, and mixtures thereof.

However, the present invention is not limited to the negative active material.

The binder adheres the active material particles to each other well, and also adheres the active material to the current collector and examples thereof may be polyvinyl alcohol, carboxylmethyl cellulose, hydroxypropyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, a polypropylene-butadiene rubber, an acrylated styrene-butadiene rubber, an epoxy resin, nylon, and the like, but are not limited thereto.

The conductive material is used to impart conductivity to the electrode, and any electronic conductive material may be used without causing chemical change in the battery, and examples thereof may be a carbon-based material such as natural graphite, artificial graphite, carbon black, acetylene black, ketjen black, a carbon fiber and the like; a metal-based material of a metal powder or a metal fiber, and the like such as copper, nickel, aluminum, silver, and the like; a conductive polymer such as a polyphenylene derivative and the like; or a mixture thereof.

The active material, conductive material and binder are mixed in a solvent to prepare an active material layer composition, and the composition is applied to a current collector to produce a negative electrode and a positive electrode, respectively. The electrode manufacturing method is well known, and thus is not described in detail in the present specification. The solvent includes N-methylpyrrolidone and the like, but is not limited thereto.

Meanwhile, the current collector according to the example embodiment of the present invention may be formed by extending from a body of the current collector without separately welding an electrode tab. Such an electrode tab is intended to electrically connect an electrode with an external device to induce a current formed in the electrode assembly to the outside.

The flexible lithium secondary battery according to the present invention may be manufactured by a conventional method generally known to a person skilled in the art in this art to which the present invention belongs.

In addition, the lithium secondary battery 100 of the present invention may be applied not only to a lithium ion secondary battery but also to a secondary battery including a lithium ion polymer battery, an electric double layer capacitor, and a pseudo capacitor, preferably to a small lithium ion secondary battery.

In addition, the flexible battery of the present invention may be used as a battery of electrical and/or electronic devices that require flexibility, it may be widely used in portable electronic devices such as watch straps of smart watches, flexible display devices, etc.

Figure 2:
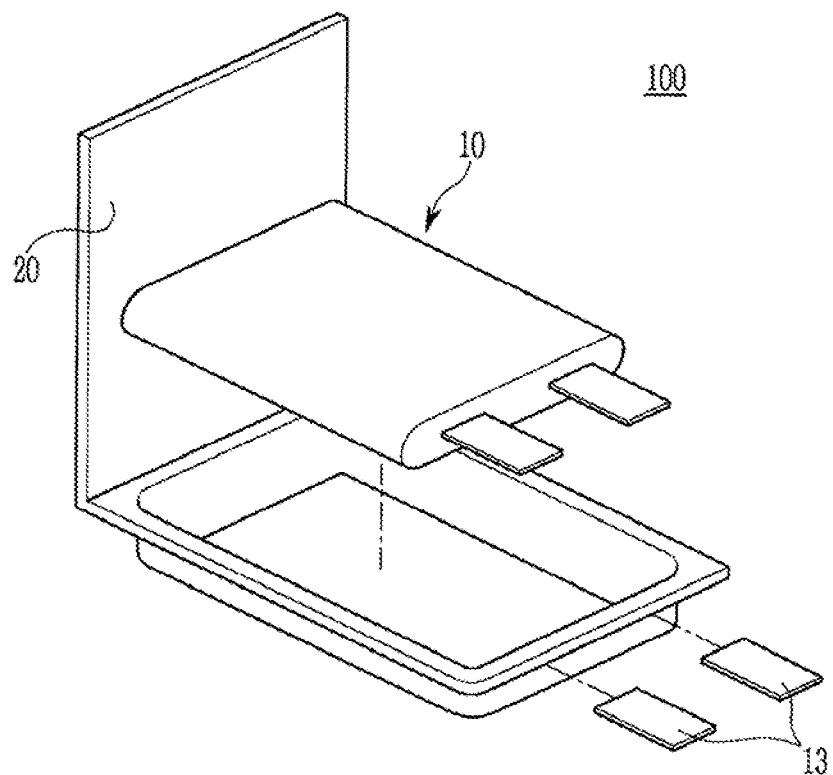
FIG. 2 is a schematic view showing a lithium secondary battery according to an embodiment.

FIG. 2 is a schematic view showing a lithium secondary battery according to an embodiment.

Referring to FIG. 2, a lithium secondary battery 100 according to an embodiment may include an electrode assembly 10, a battery case 20 housing the electrode assembly 10, and an electrode tab 13 which serves as an electrical path for inducing a current formed in the electrode assembly 10 to the outside. The two sides of the battery case 20 overlap with each other to seal each other. In addition, an electrolyte solution is injected into the battery case 20 including the electrode assembly 10.

The electrode assembly 10 is composed of a positive electrode, a negative electrode opposed to the positive electrode and a separator disposed between the positive electrode and the negative electrode.

The electrolyte solution includes an organic solvent and a lithium salt.

The organic solvent acts as a medium for transporting ions involved in the electrochemical reaction of the battery. The organic solvents may be selected from a carbonate based, ester based, ether based, ketone based, alcohol based, and aprotic solvents.

The carbonate based solvent may be for example dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), and the like.

In particular, when a mixture of linear carbonate compound and cyclic carbonate compound is used, a solvent having a low viscosity and an increased dielectric constant may be prepared. In this case, the cyclic carbonate compound and the linear carbonate compound may be mixed at a volume ratio of about 1:1 to 1:9.

In addition, the ester based solvent may be for example methylacetate, ethylacetate, n-propylacetate, dimethylacetate, methylpropionate, ethylpropionate, γ-butyrolactone, decanolide, valerolactone, mevalonolactone, caprolactone, and the like. The ether solvent may be for example dibutylether, tetraglyme, diglyme, dimethoxyethane, 2-methyltetrahydrofuran, tetrahydrofuran, and the like and the ketone based solvent may be cyclohexanone, and the like. In addition, ethyl alcohol and isopropyl alcohol may be used as the alcohol based solvent.

The organic solvent may be used alone or in a combination of one or more, and a mixing ratio in the case of mixing one or more may be appropriately adjusted according to a desired battery performance.

The electrolyte solution may further include additives such as overcharge inhibitors of ethylenecarbonate, pyrocarbonate, and the like.

The lithium salt dissolves in organic solvents, acting as a source of lithium ions in the battery, enabling an operation of basic lithium secondary batteries, and promoting transfer of lithium ions between the positive electrode and negative electrode.

Specific examples of the lithium salt may be $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, (wherein, x and y are natural numbers), LiCl, LiI, $LiB(C_2O_4)_2$ (lithium bis(oxalato) borate; LiBOB), or a combination thereof.

A concentration of the lithium salt may be used within the range of about 0.1M to about 2.0M. When the concentration of a lithium salt is included in the range, the electrolyte solution may have an excellent conductivity and viscosity, thus exhibiting excellent electrolyte solution performance and allowing lithium ions to be transferred effectively.

The separator may include any materials generally used in the lithium battery as long as separating a negative electrode from a positive electrode and providing a transporting passage for lithium ions. In other words, the separator may have a low resistance to ion transportation and an excellent impregnation for an electrolyte. For example, it is selected from a glass fiber, polyester, polyethylene, polypropylene, polytetrafluoroethylene (PTFE), or a combination thereof, and may be non-woven fabric or woven fabric. For example, polyolefin-based polymer separators such as polyethylene, polypropylene, etc. are mainly used for lithium ion batteries, and coated separators including ceramic components or polymer materials may be used to secure heat resistance or mechanical strength, and optionally may be used as a mono-layered or multi-layered structure.

The operating average voltage (SOC 50%) of the lithium secondary battery may be less than 3.55 V, for example, 3.3 V to 3.5 V. If it is charged up to 12 V through series 4-cell configuration within the voltage range, more than 80% of SOC (state of charge) may be realized, so it is possible to replace the 12 V lead acid battery.

MODE FOR INVENTION

Hereinafter, the embodiments are illustrated in more detail with reference to examples. These examples, however, are not in any sense to be interpreted as limiting the scope of the invention. Furthermore, what is not described in this disclosure may be sufficiently understood by those who have knowledge in this field and will not be illustrated here.

Manufacture of Current Collector

Example 1

A current collector was manufactured by plating nickel to be 70 nm thick as a first metal layer on a woven fabric panel (easily available from a company carrying a fabric panel), depositing copper to be 350 nm thick thereon, and then, plating nickel to be 80 nm thick thereon as a third metal layer.

Example 2

A current collector was manufactured according to the same method as Example 1 except that a high density woven fabric panel (easily available from a company carrying a fabric panel) instead of the woven fabric panel was used.

Comparative Example 1

A Cu foil was used as a current collector of a negative electrode instead of forming a plating layer on a fabric panel.

Comparative Example 2

A current collector was manufactured according to the same method as Example 1 except that a non-woven fabric panel (easily available from a company carrying a fabric panel) instead of the woven fabric panel was used.

Manufacture of Coin Half-Cell

A negative electrode was manufactured by dispersing 97.5 wt % of natural graphite as a negative active material, 1.0 wt % of a thickener, and 1.5 wt % of SBR (a styrene butadiene rubber) as a binder in DI water to prepare slurry and then, coating and drying the slurry on the aforementioned current collector.

As for a counter electrode of the negative electrode, metal lithium was used to manufacture a coin half-cell. An electrolyte solution was prepared by dissolving 1.15 M LiPF6 in a mixed solvent of ethylene carbonate (EC), propylene carbonate (PC), ethyl propionate (EP), and propyl propionate (PP) in a volume ratio of 2/1/4/3.

Evaluation 1: Measurement Test of Elongation Rate

An elongation rate is obtained by calculating a deformation rate of an object until broken in a tension test of the object with a reference to a state thereof before the test as a percentage, and as the percentage is higher, flexibility is increased.

Figure 4:
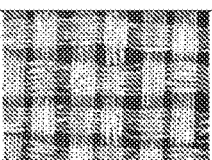
FIG. 4 illustrates Table 1.
Figure 4:
Figure 4:
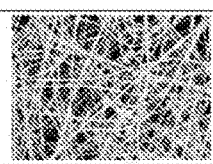

The elongation rate was measured by using an Instron equipment (Model No. 3345). The elongation rate was obtained through a stress-strain curve obtained by pulling specimens with a predetermined force, while held at both ends. The results are shown in Table 1 of FIG. 4.

Referring to Table 1, the elongation rates of the current collectors according to Examples were in a range of 20% to 30%, and flexibility thereof relative to those of Comparative Examples was increased.

Evaluation 2: Rate Capability Test

The lithium secondary battery cells according to Examples 1 and 2 and Comparative Examples 1 and 2 were charged and discharged at a voltage of 3.0 V to 4.4 V under each condition of 0.2 C, 0.5 C, 1.0 C, and 2.0 C to evaluate rate capability, and then, a ratio of 0.2 C charge capacity relative to 2 C charge capacity was calculated, and the results are shown in Table 2.

Referring to Table 2, the ratios of 0.2 C charge capacity relative to 2 C charge capacity of the lithium secondary battery cells of Examples were excellent compared with those of Comparative Examples, and accordingly, excellent rate capability was obtained.

Evaluation 3: Cycle-Life Test

The lithium secondary battery cells of Examples 1 and 2 and Comparative Examples 1 and 2 were evaluated with respect to cycle-life characteristics.

Specifically, formation the battery cells was once performed at current density of 0.1 C and three times performed at current density of 0.2 C through charge and discharge within a battery voltage of 4.4 V to 3.0 V at a temperature of 25° C. Subsequently, the charge and discharge was repeated within a battery voltage of 4.4 V to 3.0 V at 1 C at a temperature of 25° C. Herein, discharge capacity retentions of the cells were calculated by dividing discharge capacity of the $50^{th}$ charge and discharge by discharge capacity of $1^{st}$ charge and discharge, and the results are shown in Table 2 and FIG. 3.

TABLE 2

| Sample list | | Rate characteristics (charge) | | | | | Cycle-life characteristics | | |
| --- | --- | --- | --- | --- | --- | --- | --- | --- | --- |
| Nos. | Plating content | 0.2 C | 0.5 C | 1 C | 2 C | 2 C/0.2 C | 1st | 50th | 50th/1st |
| Example 1 | Ni/Cu/Ni woven | 339.1 | 337.8 | 315.3 | 222.1 | 65.5% | 315.8 | 250.1 | 79.2% |
| Example 2 | Ni/Cu/Ni woven (high density) | 333.5 | 331.7 | 313.4 | 222.5 | 66.7% | 317.1 | 241.9 | 76.3% |
| Comparative Example 1 | (Cu foil) | 329.0 | 320.3 | 290.2 | 206.1 | 62.6% | 297.7 | 222.4 | 174.7% |
| Comparative Example 2 | Ni/Cu/Ni non-woven fabric | 332.0 | 330.4 | 309.3 | 206.7 | 62.3% | 310.9 | 238.0 | 76.6% |

Figure 3:
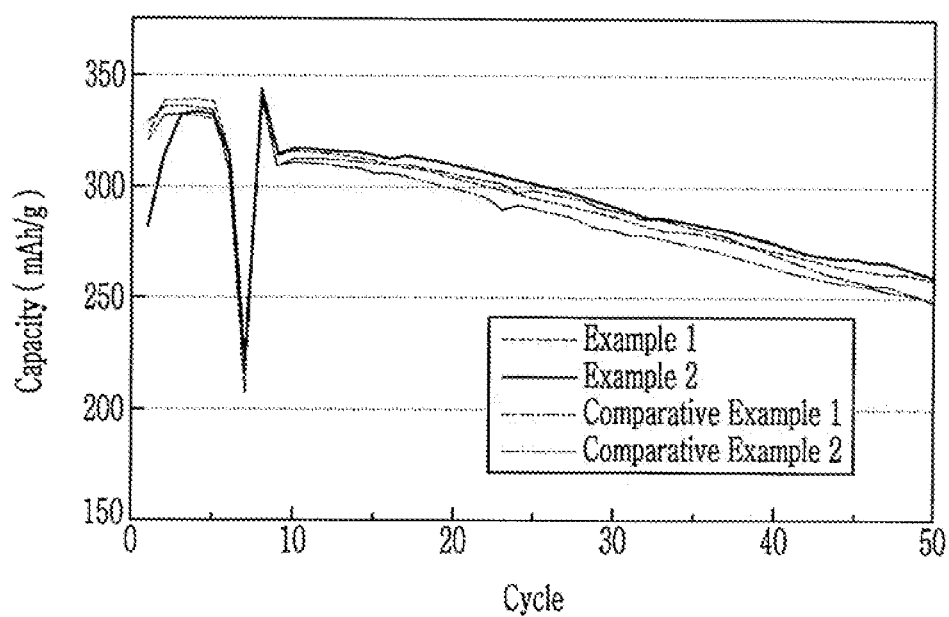
FIG. 3 is a graph showing cycle-life characteristics of lithium secondary battery cells according to an embodiment.

FIG. 3 is a graph showing cycle-life characteristics of lithium secondary battery cells according to an embodiment.

Referring to FIG. 3 and Table 2, Examples 1 and 2 exhibited improved discharge capacity retention compared with Comparative Examples 1 and 2.

Accordingly, the lithium secondary battery cells of Examples 1 and 2 having a current collector including a structure in a fabric form in which fiber bundles were cross-woven exhibited improved cycle-life characteristics.

The present invention is not limited to the above descriptions, but may be embodied in various forms, and a person skilled in the technical field to which the present invention belongs may appreciate that the present invention may be implemented in other forms without changing the technical spirit or essential characteristics of the present invention. Therefore, the above descriptions are to be understood in all respects as illustrative and not restrictive.

What is claimed is:

1. A lithium secondary battery comprising an electrode, the electrode including:
   a current collector including a metal layer on a current collector substrate having a uniform structure; and
   an active material layer on at least one surface of the current collector,
   wherein:
   the current collector substrate includes a structure in a fabric form, and the structure in the fabric form is polyethylene terephthalate,
   the metal layer includes a first metal layer and a second metal layer on the first metal layer,
   the first metal layer includes cobalt, iron, or silver,
   the second metal layer includes copper,
   the fabric form includes fiber bundles, and
   a diameter of the fiber bundles is 18 μm to 20 μm.

2. The lithium secondary battery of claim 1, wherein a thickness of the metal layer is 150 nm to 1,500 nm.

3. The lithium secondary battery of claim 1, wherein the metal layer includes nickel, cobalt, iron, or silver; and copper, or aluminum.

4. The lithium secondary battery of claim 1, wherein:
   the metal layer further includes a third metal layer on the second metal layer, and
   the third metal layer includes nickel, cobalt, iron, or silver.

5. The lithium secondary battery of claim 4, wherein a thickness of the second metal layer is larger than a thickness of each layer of the first metal layer and the third metal layer.

6. The lithium secondary battery of claim 4, wherein a thickness of the second metal layer is 100 nm to 1,000 nm.

7. The lithium secondary battery of claim 4, wherein a thickness ratio of the second metal layer relative to a thickness of each layer of the first metal layer and the third metal layer is greater than 1 and less than or equal to 6.

* * * * *